US006763734B2

(12) United States Patent
Shukla et al.

(10) Patent No.: US 6,763,734 B2
(45) Date of Patent: Jul. 20, 2004

(54) MAGNETIC PIPETTE

(76) Inventors: Ashok Kumar Shukla, 10316 Kingsway Ct., Ellicott City, MD (US) 21042; Mukta Misra Shukla, 10316 Kingsway Ct., Ellicott City, MD (US) 21042; Amita Misra Shukla, 10316 Kingsway Ct., Ellicott City, MD (US) 21042

( * ) Notice: Subject to any disclaimer, the term of this patent is extended or adjusted under 35 U.S.C. 154(b) by 106 days.

(21) Appl. No.: 10/003,422

(22) Filed: Dec. 6, 2001

(65) Prior Publication Data

US 2003/0106382 A1 Jun. 12, 2003

(51) Int. Cl.[7] .................................................. G01N 1/00
(52) U.S. Cl. .................................................. 73/864.01
(58) Field of Search .......................... 73/864.01–864.18; 422/104, 100; 436/180; 248/206.5, 274.1, 276.1, 277.1, 309.4

(56) References Cited

U.S. PATENT DOCUMENTS 2,510,198 A * 6/1950 Tesmer
3,713,614 A * 1/1973 Taylor
4,161,508 A * 7/1979 Janchen
5,135,189 A * 8/1992 Ghazizadeh
5,163,566 A * 11/1992 Hempel
5,505,097 A * 4/1996 Suovaniemi et al.
5,695,165 A * 12/1997 Moriarty
6,149,116 A * 11/2000 Won
6,267,487 B1 * 7/2001 Tucker et al.
6,357,710 B1 * 3/2002 Fielden et al.

* cited by examiner

*Primary Examiner*—Robert Raevis

(57) ABSTRACT

In this invention we describe a magnet or magnetic material that is attached to a pipette to hang it on a ferrous or magnetic material. The magnet can be attached to any place on the pipette in such a way that the pipette can be hung as desired on the magnetic or ferrous surface such as ferrous clips, iron or steel sheets (refrigerator, lab bench, hood etc.). This will help to organize the laboratories. Furthermore this will reduce the contamination from pipette to pipette and sample to sample.

1 Claim, 5 Drawing Sheets

MAGNETIC PIPETTE

FIELD OF THE INVENTION

In this invention we describe a magnet or magnetic material attached to a pipette or pipetting device to hang the pipetting device onto a ferrous or magnetic material. The magnet can be attached to any surface on the pipette in such a way that the pipette can be temporally attached to, or hung as desired, on any magnetic or ferrous surface such as ferrous clips, iron or steel sheets (e.g. refrigerator, lab bench, hood). The pipette described in the present invention can be stored more effectively in research laboratories and the present invention will help to reduce the contamination of pipettes, pipette tips and samples transported by them.

BACKGROUND OF THE INVENTION

In chemical and biomedical labs, pipetting devices (also known as pipettes, micropipettes or pipettors) are used frequently and routinely to aspirate, transport and dispense small sample volumes. The applications of such devices range from measuring predetermined volumes of the sample to transporting samples from one container to another. The sample can either be drawn directly into a disposable or non-disposable pipette or into a disposable or non-disposable pipette tip attached to the pipetting device.

However, when they are not in use, these pipetting devices are stored in a number of different ways. For example, they can be placed on a hanger, affixed to a wall or vertical surface, or they can be placed in a support structure or stand placed on the lab bench surface. Alternatively, they may be placed in drawers or simply be left lying on the lab counter surface.

In many of the above methods, the storing device, into which the pipetting device is placed, is attached to another surface. For example, current pipette hangers are fixed onto a surface by glue, a screw or a magnet. If the pipetting device is used in a different location, far removed from the hanger, there is a tendency by the device user to just leave the pipette on the lab bench, which can cause contamination of the pipetting device or pipette tip.

When a pipette stand is used, it can easily be moved from one location to another on the lab bench, but such stands often occupy significant amounts of space on lab benches where space is very tight.

To overcome the limitations of currently available alternatives, the present invention provides a practical and space-efficient solution for storing pipettes and pipetting devices and it facilitates the use and organization of such pipetting devices in the laboratory.

In US Patents (U.S. Pat. Nos. 5,979,675 and 5,695,165) Moriarty described the use of hangers, which can be attached to a metallic surface by a built-in magnet in the hanger or by the use of permanent methods such as adhesives, or screws with which the hanger is attached to a surface. However, if pipettes of different types and size are used, different types of hangers need to be used in the lab to accommodate for these variations among different devices. Currently, there are over a dozen different pipetting device manufacturers (such as, Eppendorf, Rainin, Oxford, Gilson, and Finnpipette) each of whom makes different types of pipetting devices. Since there are significant variations among their devices, it becomes impractical to have a spectrum of different types of hangers or stands in labs where pipettors from many different manufacturers are used.

In the present invention, a magnet or magnetic material is attached to any surface on a pipette or pipetting device such that it can be non-permanently attached to any ferrous metallic or magnetic surface. By having a magnet or magnetic material attached directly to the pipette or pipetting device, it can be conveniently stored in the lab. According to the present invention, the magnet or magnetic component can be embedded or built into the pipetting device during the pipetting device manufacturing process. Alternatively, the magnet or magnetic material can be attached to any existing pipette or pipetting device such that devices currently in existence can be modified. Thus, a scientist can simply place the magnet on the pipetting device and then use that to attach it to any ferrous or other magnetic surfaces.

While pipettes with built-in magnets are better suited for sterilization, those with an attachable magnetic unit give the user flexibility in modifying the pipetting device as needed.

SUMMARY OF THE INVENTION

In this invention we describe a magnet or magnetic material attached to a pipette or pipetting device to hang the pipetting device onto a ferrous or magnetic surface. The magnet can be attached to any surface on the pipette in such a way that the pipette can be temporally attached to, or hung as desired, on any magnetic or ferrous surface such as ferrous clips, iron or steel sheets (e.g. metal cabinet, refrigerator, lab bench, hood). The pipette described in the present invention can be stored more effectively in research laboratories and the present invention will help to reduce the contamination of pipettes, pipette tips and samples transported by them.

The various features of novelty, which characterize the present invention, are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which.

DESCRIPTION OF THE PREFERRED EMBODIMENTS

Figure 1:
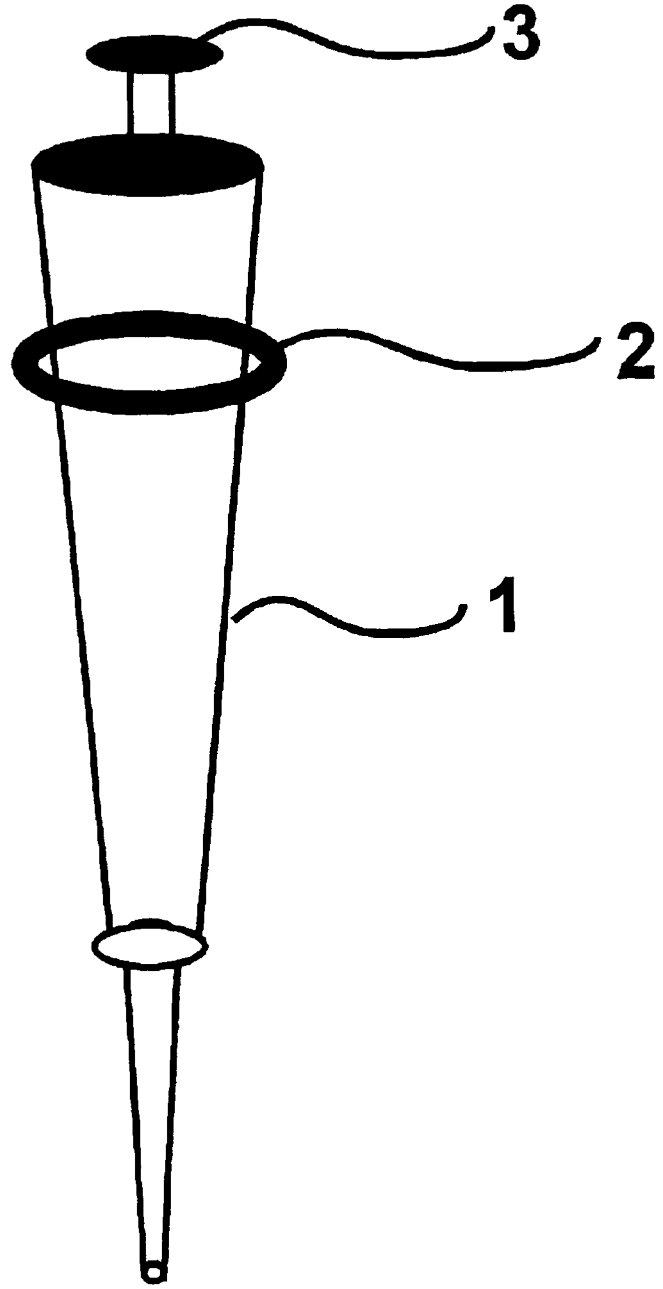
FIG. 1 is an expanded view of one embodiment of the pipetting device, according to the present invention, wherein a magnet is attached to the pipetting device.

FIG. 1 shows an expanded view of the pipetting device (1), and magnet (2) where said magnet is attached to the pipetting device. The pipetting device can be of any shape or size. The magnet (2) can also be replaced with any magnetic material, such as a material with magnetic properties or a magnetizable material (any material which can be magnetized or is magnetizable either by physical, chemical or electromagnetic methods). The magnet (2) can be in a ring form or a strip or in any other shape, which allows the pipetting device (1) to hang onto a ferrous metallic surface. The magnet can be placed on the pipetting device in any configuration such that the scientist can hang the pipetting device at any desired angle.

Furthermore, the magnet (2) or magnetic material can be attached to the pipette as a tight ring around the pipette or can be attached via a screw, glue, or adhesive, adhesive strip or combinations thereof. Specifically, said magnet or magnetic material can be attached to said pipetting device by a method selected from the group comprised of adhesives-based, single-sided adhesive strip-based, double sided adhesive strip-based, screw-based, magnetic force-based, electromagnetic force-based, heat-based, pressure-based, embedding-based, clip-based, magnetic strip-based methods and combinations thereof.

In addition, the magnet (2) can consist of more than one type of magnetic material such that said pipette tip is attached to a magnetic surface by means of a magnetic force. In addition, the magnet, or magnetic material, can be of any a shape or size that provides for stable attachment of the pipetting device to a magnetic surface.

The pipetting device (1) can be a pipetting device selected from the group comprised of an electronic pipetting device, a mechanical pipetting device, an aspiration-based pipetting device, a suction-based aspirating device, and combinations thereof. Furthermore, the device (1) can be selected from the group comprised of a fixed volume pipetting device, a variable volume pipetting device, a single channel pipetting device, a multi-channel pipetting device, a glass pipetting device, a plastic pipetting device, a manual pipetting device, an automatic pipetting device, an electronic pipetting device, a repeat-dispensing pipetting device, and combinations thereof.

Furthermore, the pipetting device can contain more than one magnet (2) or magnetic material to make a stable hanger, since some pipetting devices may be heavier and may need more than one magnetic device to support the weight of the pipetting device and for secure hanging. The magnet can be permanently attached to said pipetting device during the manufacture of said device. Alternatively, said magnet can be reversibly attached to said pipetting device. For example, a user could use self-adhesive strips or other methods to attach the magnet (2) to the pipetting device (1).

Figure 2:
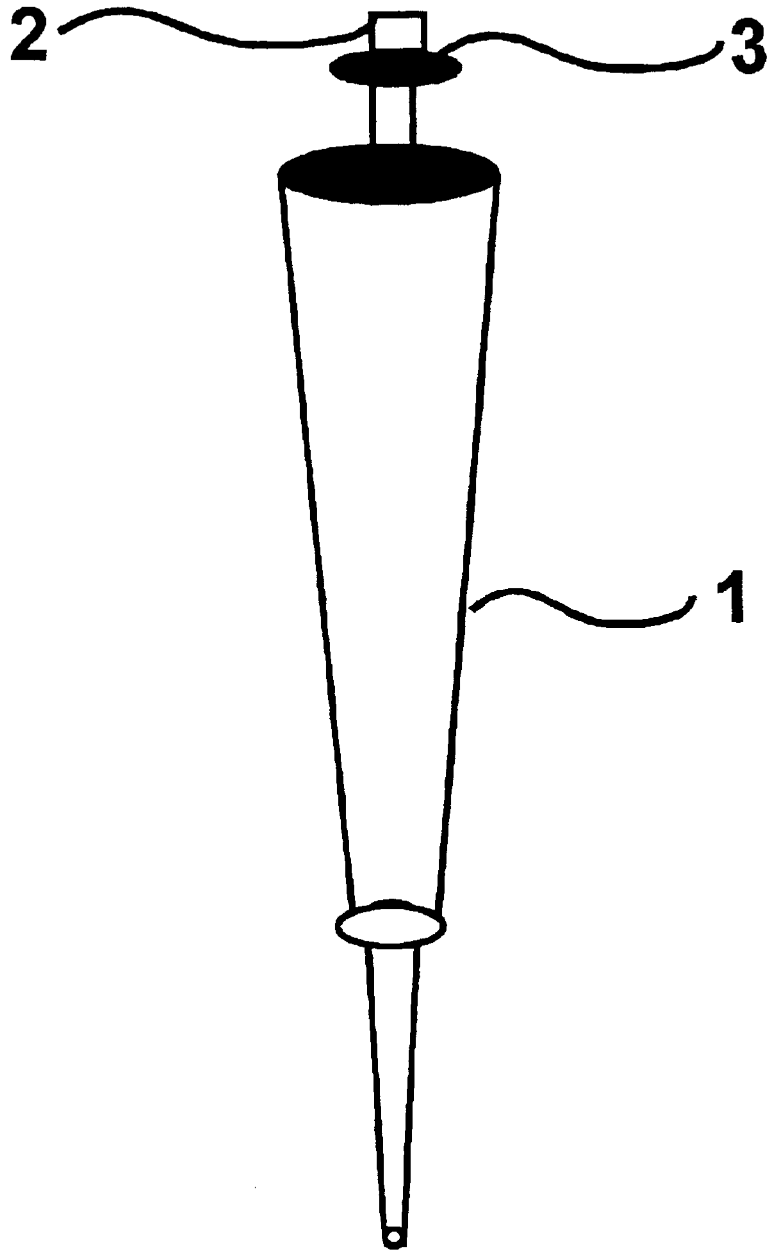
FIG. 2 is an expanded view of one embodiment of the pipetting device, according to the present invention, wherein a magnet is attached to the top of the pipetting device.

As shown in FIG. 2, the magnet (2) can be placed at the top (3) of the pipetting device, where the pressure is applied by a human thumb to pipette and dispense the sample. In FIG. 2, the magnet (2) can be covered by a soft foam or material so as to prevent it from hurting the thumb, which could be a potential problem in a lab setting where such devices are used repeatedly throughout the day.

The magnet (2) can be made of any ferrous material or alloy, which can be magnetized or of a magnetic material that can be attached to a magnet. The magnetic property of the magnet, magnetic material or magnetizable material can be created by any means including physical, chemical, electromagnetic and electrochemical.

Figure 3:
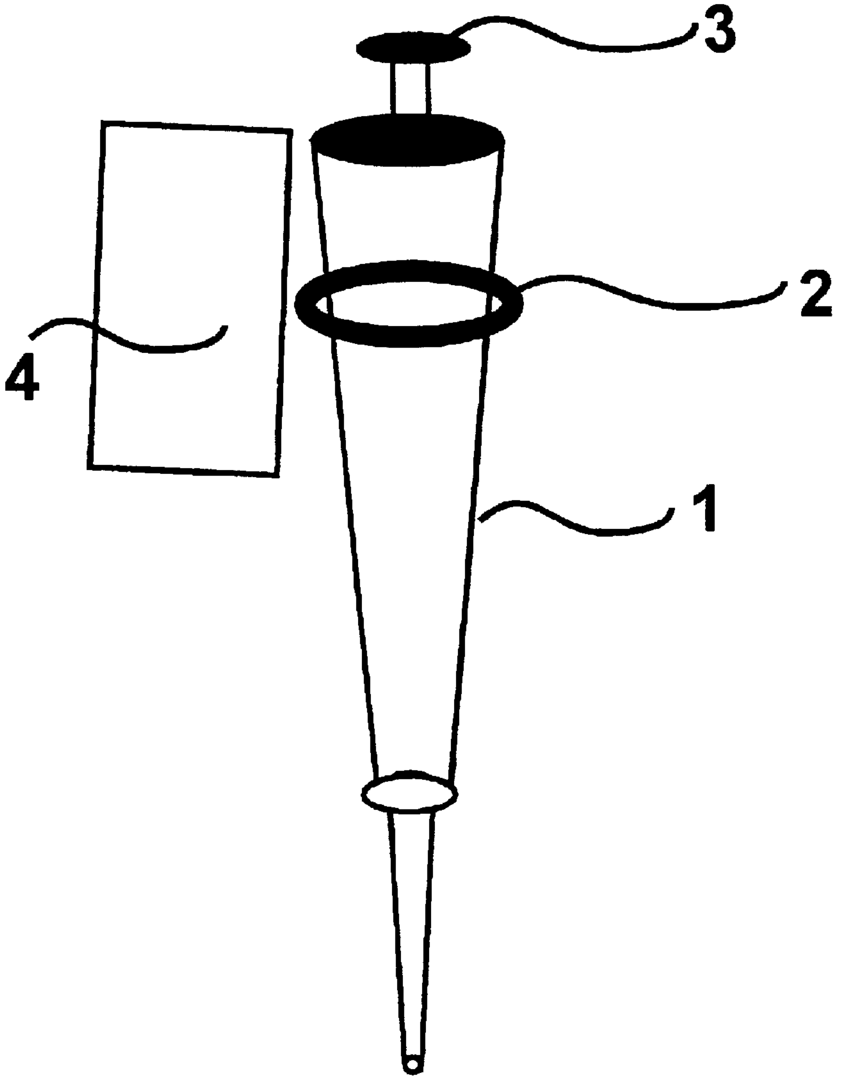
FIG. 3 is an expanded view of one embodiment of the pipetting device, according to the present invention, where the pipetting device is attached to the magnetic material on lab furniture.

FIG. 3 shows a hanger (4) made of a magnetic material. The hanger itself can also be a magnet or made of a magnetic material such that the pipetting device (1) containing the magnet (2) is attached to the hanger (4) by a magnetic force.

Figure 5:
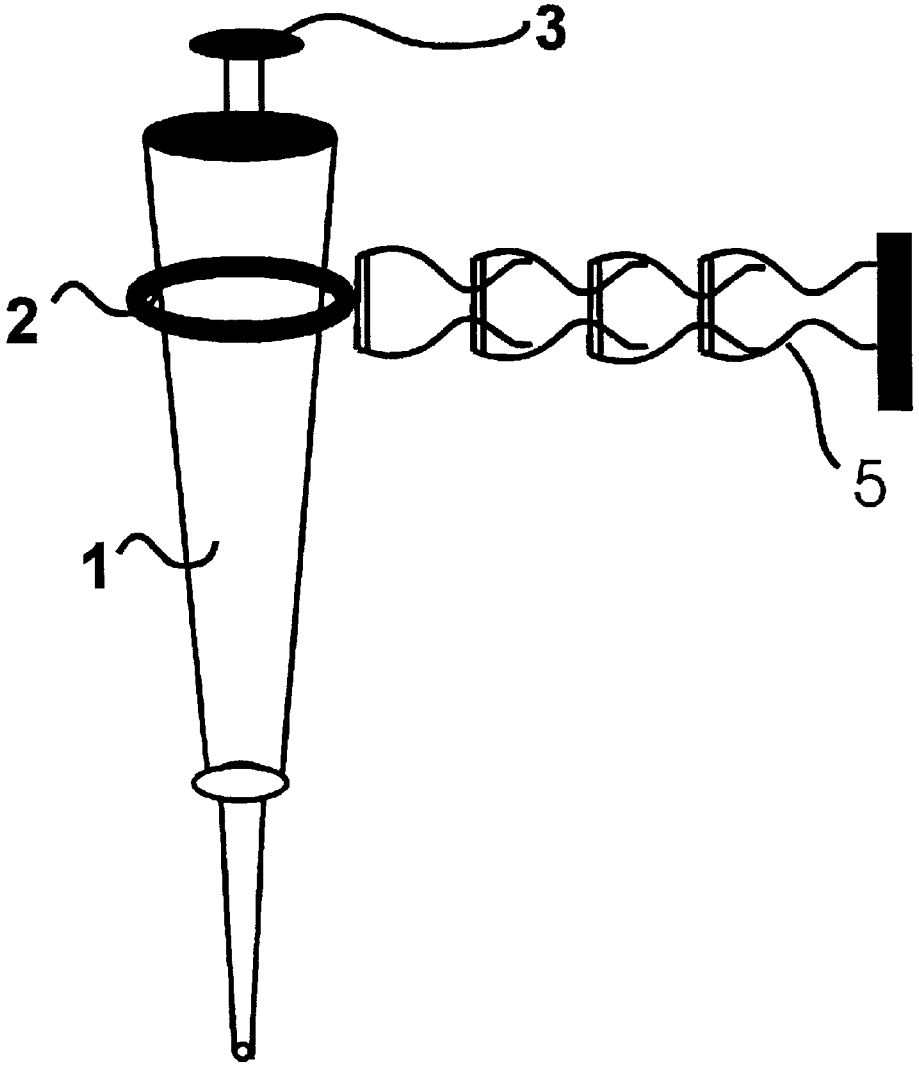
FIG. 5 is an expanded view of one embodiment of the pipetting device, according to the present invention, where a flexible arm is attached to the hanger.

The hanger can be either fixed on the lab bench surface or any other surface in the lab. It can be a flexible arm type of hanger, which can be made, as shown in FIG. 5, of interlocking segments (5) (purchased from known brand name Lock-line from Lockwood Products, Inc.) This will provides the user with more flexibility to keep the pipetting device at a desired location and height in the lab.

The broader usefulness of the invention may be illustrated by the following example.

EXAMPLE #1

Magnetic Rings for a Pipetting Device.

Figure 4A:
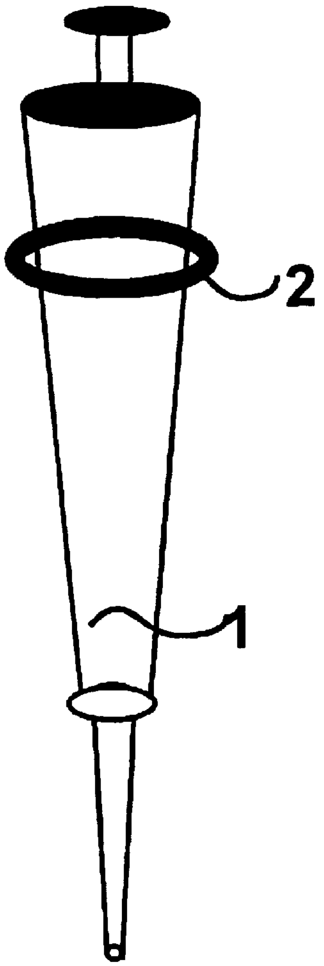
FIGS. 4*a*, 4*b* and 4*c* are expanded views of the pipetting device, according to the present invention, wherein each picture shows a different way of attaching the magnet to the pipetting device.
Figure 4B:
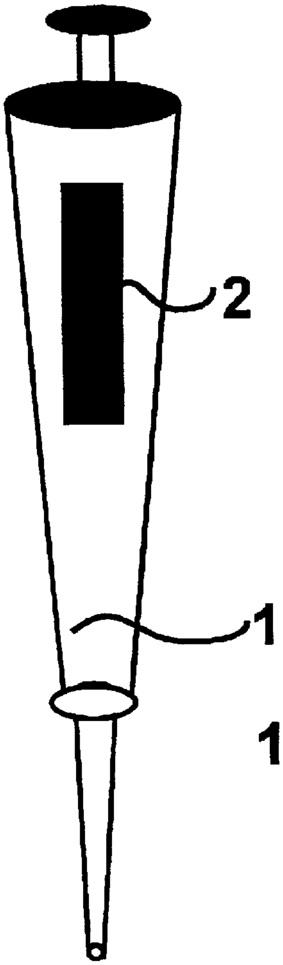
Figure 4C:
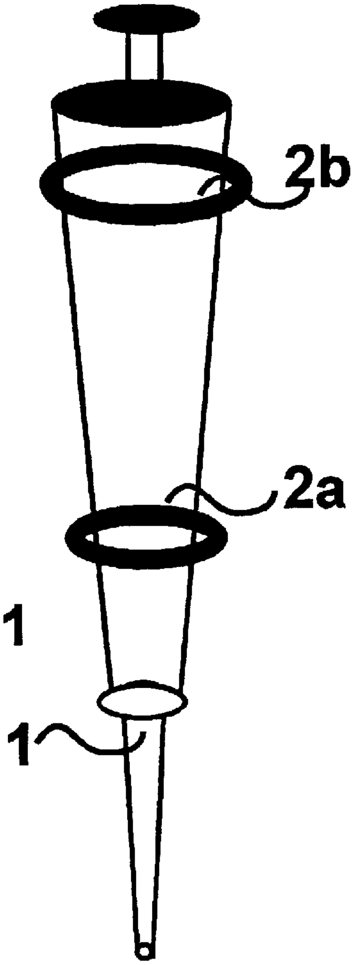

FIGS. 4*a*, 4*b* and 4*c* show a number of different ways in which a magnet or magnetic material can be attached to a pipetting device. To obtain stable support, more than one magnet is used as shown in (2*a*) and (2*b*). This multi-magnet system provides better support for maintaining the pipetting device in an upright position.

While a specific embodiment of the invention has been shown and described in detail to illustrate the application of the principles of the invention, it is understood that the invention may be embodied otherwise without departing from such principles and that various modifications, alternate constructions, and equivalents will occur to those skilled in the area given the benefit of this disclosure and the embodiment described herein, as defined by the appended claims.

What is claimed is:

1. A pipetting device that includes an elongated body, and a magnet fixedly attached to the exterior of the body, such that the magnet provides a means for temporarily attaching the pipetting device to any metallic surface located externally of the device.

* * * * *